United States Patent [19]
Fliesser

[11] 3,730,616
[45] May 1, 1973

[54] CINEMATOGRAPHIC APPARATUS

[75] Inventor: Engelbert Fliesser, Munich, Germany

[73] Assignee: Agfa-Gevaert Aktiengesellschaft, Leverkusen, Germany

[22] Filed: Sept. 23, 1971

[21] Appl. No.: 182,980

[30] Foreign Application Priority Data

Sept. 25, 1970 Germany ................. P 20 47 351.2

[52] U.S. Cl. ................. 352/166, 352/173, 352/168
[51] Int. Cl. ................................. G03b 1/00
[58] Field of Search ................. 352/166, 173, 181, 352/185, 157, 158, 159, 187, 168

[56] References Cited

UNITED STATES PATENTS

| | | | |
|---|---|---|---|
| 2,788,703 | 4/1957 | Holman | 352/187 X |
| 3,471,228 | 10/1969 | Martin | 352/191 |
| 2,108,852 | 2/1938 | Gettinger | 352/166 X |
| 666,495 | 1/1901 | Casler | 352/184 |
| 1,855,773 | 4/1932 | Sapier | 352/194 X |
| 2,412,551 | 12/1946 | Pratt | 353/95 |
| 3,165,250 | 1/1965 | Ewald | 352/184 X |

*Primary Examiner*—Samuel S. Matthews
*Assistant Examiner*—Monroe H. Hayes
*Attorney*—Michael S. Striker

[57] ABSTRACT

A motion picture projector wherein the supply and takeup reels are rotatable in either direction by way of friction clutches and wherein the film is moved stepwise past the gate by two transporting devices which employ friction wheels and pressing rollers serving to bias the film against the respective friction wheels. The friction wheels are driven by way of friction clutches from a separate motor or from the motor which serves to drive the supply and takeup reels. An electromagnetically operated arresting device is located between the gate and one of the transporting devices to hold the film against lengthwise movement by the one transporting device when the other transporting device is free to move the film past the gate, and an electromagnetically operated blocking device is mounted between the gate and the other transporting device to hold the film against movement past the gate when the image of a film frame is being projected and while the arresting device is inoperative to thus permit the film to form a loop upstream of the gate.

16 Claims, 3 Drawing Figures

PATENTED MAY 1 1973
3,730,616
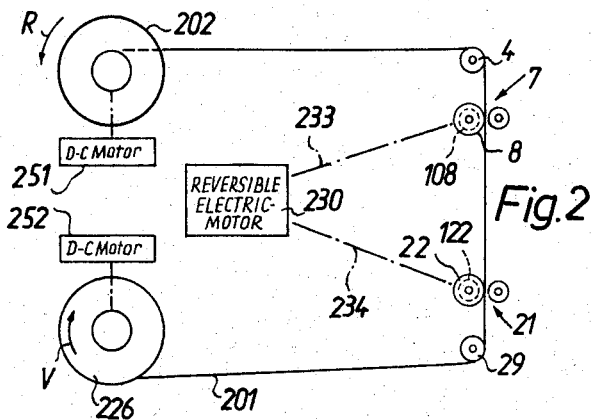
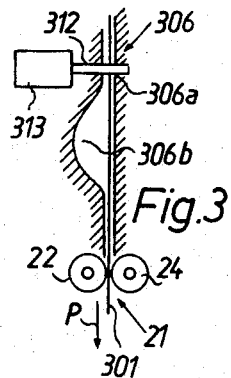
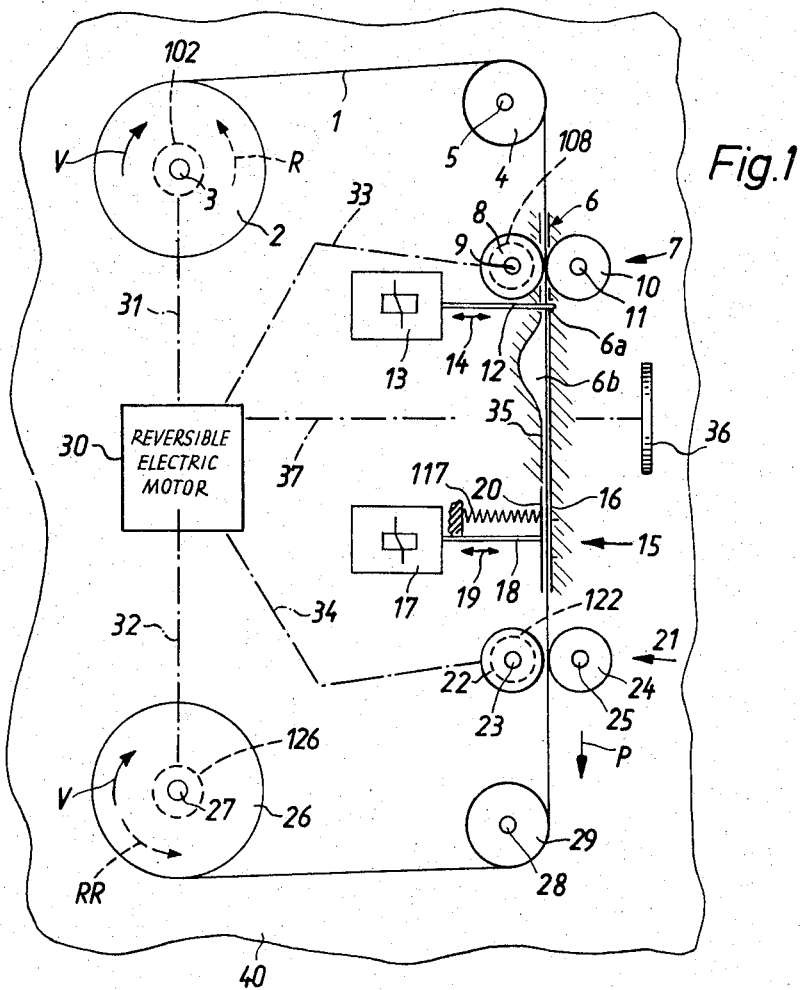
INVENTOR
ENGELBERT FLIESSER
BY
Attorney

CINEMATOGRAPHIC APPARATUS

BACKGROUND OF THE INVENTION

The present invention relates to cinematographic apparatus in general, especially to motion picture projectors, and more particularly to improvements in film feeding mechanisms for use in cinematographic apparatus.

In cinematographic apparatus, the film is moved past the film gate in stepwise fashion by a feeding mechanism which insures that an unexposed film frame registers with the gate whenever the shutter of a motion picture camera admits scene light or that a different exposed and developed film frame registers with the gate whenever the shutter of a motion picture projector allows projection light to pass through the lens and to project the image of such film frame onto a screen or the like. The film is normally perforated and the feeding mechanism normally employs a so-called claw pulldown which is controlled by one or more cams and performs recurrent working and return strokes to advance the film by the length of a frame during each working stroke and to reassume a starting position upon completion of each return stroke. It is also known to employ in cinematographic apparatus film feeding mechanisms which employ strikers or impellers, friction drives and means utilize film arresting members. The conventional film feeding mechanisms are normally designed with a view to effect gradual acceleration of motion picture film from and gradual deceleration of film to zero speed in order to avoid tearing, especially in the region of the perforations. Such gradual acceleration and deceleration of motion picture film can be achieved by resorting to relatively complex feeding mechanisms which are prone to malfunction and comprise a large number of precision-finished parts. It was found that presently known motion picture films are capable of standing reasonably large tensional stresses without any damage, even if the stressing is repeated at frequent intervals and for long periods of time. This means that the presently used motion picture films can stand, without any noticeable damage, rapid acceleration from zero speed to full forward or rearward speed and/or rapid deceleration from full forward or rearward speed to zero speed.

SUMMARY OF THE INVENTION

An object of the invention is to provide a cinematographic apparatus, particularly a motion picture projector, with novel means for transporting the film stepwise or continuously, forwardly or backwards, past a film gate.

Another object of the invention is to provide a cinematographic apparatus with a simple, compact and inexpensive film transporting mechanism which renders it possible to transport the film at two or more frequencies, which is capable of rapidly collecting the film on the core of the supply reel or takeup reel, which allows for rapid forward transport of film so as to place a selected film frame into register with the film gate, which allows for rapid return movement of film for the purpose of repeatedly projecting the image or images of one or more film frames, and which insures accurate registry of film frames with the film gate during the projection of images of an exposed and developed film or during the exposure of unexposed film frames to scene light.

A further object of the invention is to provide a motion picture projector with novel and improved means for holding the film against lengthwise movement in the region of the film gate during the intervals of projection of the images.

An additional object of the invention is to provide a motion picture projector wherein the film can be rapidly accelerated to and rapidly decelerated from a selected forward or rearward speed.

Still another object of the invention is to provide the cinematographic apparatus with novel means for driving the supply and takeup reels and for transporting the film stepwise past the film gate.

The invention is embodied in a cinematographic apparatus wherein motion picture film is transported lengthwise along a predetermined path between a supply reel and a takeup reel and which comprises a film gate adjacent to the film path, first and second transporting means which are adjacent to longitudinally spaced portions of the film path and are operative to urge the film to move past the gate in at least one direction, a blocking device which is adjacent to the film path between the two transporting means and is actuatable to assume a first position or condition in which it blocks the movement of film past the gate and a second position or condition in which it allows the movement of film past the gate by one of the two transporting means, and an arresting device which is adjacent to the film path between the blocking device and the other transporting means and is movable between operative and inoperative positions in which it respectively prevents and permits the movement of film under the action of the other transporting means. The arrangement is such that the film is looped in a predetermined portion of the path upstream of the film gate under the action of the other transporting means in the inoperative position of the arresting device and the first position or condition of the blocking device, and that the thus looped film is advanced past the gate by the one transporting means in operative position of the arresting device and the second position or condition of the blocking device.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary diagrammatic longitudinal vertical sectional view of a motion picture projector which embodies one form of the invention;

FIG. 2 is a similar fragmentary view of a modified projector; and

FIG. 3 illustrates in longitudinal vertical sectional view a detail in a third motion picture projector.

DESCRIPTION OF THE PREFERRED EMBODIMENTS

Referring first to FIG. 1, there is shown a portion of a cinematographic apparatus which is a motion picture projector and has a housing 40 accommodating or supporting two parallel driving shafts 3, 27 for a supply reel 2 and a take-up reel 26, respectively. The reels 2 and 26 are rotatable on the respective driving shafts. The perforated motion picture film 1 is normally stored on the core of the supply reel 2 and is guided along a predetermined path, defined in part by a film channel 6, past a film gate 35 behind the projection lens, not shown, and on toward the core of the takeup reel 26. A deflecting roller 4 for the film 1 is mounted upstream of the channel 6 and is rotatable on a shaft 5 which is mounted in the housing 40. A second deflecting roller 29, mounted on a shaft 28, is provided between the channel 6 and the takeup reel 26.

In accordance with a first feature of the invention, the projector comprises two film transporting devices 7 and 21 the first of which is mounted in the housing 40 upstream of the gate 35 and the second of which is mounted in the housing 40 downstream of the gate 35. The transporting device 7 is adjacent to the path which is defined by the channel 6 and is located downstream of the deflecting roller 4. The transporting device 21 is mounted upstream of the deflecting roller 29. The first transporting device 7 comprises a friction wheel 8 which is mounted at one (rear) side of the path defined by the channel 6 and is rotatable on a fixedly mounted driving shaft 9. The drive means for continuously rotating the friction wheel 8 when the projector is in use comprises the driving shaft 9 and a reversible electric motor 30 which is operatively connected with the driving shaft 9 by a power train 33 indicated by a phantom line. The shaft 9 can rotate the friction wheel 8 through the intermediary of a friction clutch 108. The transporting device 7 further comprises a pressing roller 10 which is mounted on a shaft 11 at the other (front) side of the path for the film 1 in the channel 6. The shaft 11 is biased in a direction toward the friction wheel 8 by suitable springs, not shown, so that the peripheral surface of the roller 10 normally urges the adjoining portion of the film 1 against the periphery of the friction wheel 8.

The second transporting device 21 is similar to the transporting device 7; it comprises a friction wheel 22 which can be rotated by a driving shaft 33 through the intermediary of a friction clutch 122, and a pressing roller 24 which is mounted on a spring-biased shaft 25 opposite the friction wheel 22. The driving shaft 23 is constantly rotated by the reversible electric motor 30 through the intermediary of a schematically indicated power train 34. The motor 30 can further rotate the driving shaft 3 which can rotate the supply reel 2 by way of a friction clutch 102, and the driving shaft 27 which can rotate the takeup reel 26 by way of a friction clutch 126. The operative connections or power trains between the motor 30 and the driving shafts 3, 27 are respectively shown at 31 and 32. A further power train 37 receives motion from the motor 30 and serves to rotate a disk-shaped shutter 36 which is located in front of the film gate 35. The latter is located in front of a suitable source of projection light, not shown.

The friction wheels 8 and 22 are preferably small and lightweight so as to have a low inertia and to be readily decelerated from full speed to zero speed or accelerated from zero speed to full speed within short intervals of time. Such lightweight friction wheels cannot cause excessive tensioning of the film 1 during acceleration or deceleration as well as during those intervals when the film 1 is held against lengthwise movement in the region of the transporting device 7 and/or 21. The friction clutches 108 and 122 insure the generation of a substantially constant pull without intermittent short-lasting pronounced tensioning of the film; such short-lasting peaks in the stressing of film 1 would be most likely to cause tearing or other damage.

In accordance with a further feature of the invention, the projector comprises an arresting device 12 which is shown in the form of a rod capable of introducing its tip into an oncoming perforation of the film 1 and thereupon into a cutout or opening 6a of the channel 6. The opening 6a is located immediately or closely downstream of the nip between the friction wheel 8 and the pressing roller 10 of the transporting device 7. The means for moving the arresting device 12 transversely of the path defined by the channel 6 comprises an electromagnet 13. The directions in which the arresting device 12 is movable are indicated by a double-headed arrow 14.

The channel 6 is provided with an enlarged portion 6b which is located immediately or closely downstream of the arresting device 12 but upstream of the gate 35 and is large enough to permit looping of the film 1 when the latter's forward progress is interrupted a blocking device 15 which is installed downstream of the gate 35 but upstream of the second transporting device 21. The dimensions of the enlarged channel portion 6b are selected in such a way that it can readily accommodate a predetermined length of the film 1, namely, a length which equals or exceeds that of a film frame.

The blocking device 15 is adjacent to the downstream end of the channel 6 and its stationary portion 16 (which is located in front of the path for the film 1) may but need not constitute an integral part of the channel. In addition to the stationary portion 16, the blocking device 15 comprises a movable portion in the form of a pressure plate 20 which is mounted on or forms part of the rod-shaped armature 18 of an electromagnet 17 and is movable, preferably through minute distances, in directions indicated by the double-headed arrow 19. The arrangement is preferably such that the portions 16, 20 of the blocking device 15 define for the film 1 a passage whose width is just sufficient for the film to advance between such portions with minimal clearance or with no clearance. When the electromagnet 17 is energized, or when the condition of energization of the electromagnet 17 is changed, the armature 18 urges the pressure plate 20 forwardly and the pressure plate then cooperates with the fixed portion 16 of the blocking device 15 to temporarily interrupt the forward progress of the film 1 under the action of the transporting device 21. The intervals during which the blocking device 15 assumes that condition in which it interrupts the forward transport of film 1 by the device 21 correspond to the intervals during which the images of successive frames of the film 1 are projected onto a screen or the like.

The power trains 33, 34 which rotate the driving shafts 9, 23 for the friction wheels 8, 22 of the transporting devices 7 and 21 may but need not comprise suitable belt or chain drives. During rapid forward transport of the film 1 from the supply reel 2 to the takeup reel 26, the friction clutch 126 is inactive and the driving shaft 27 is directly coupled to the reel 26 in a manner well known from the art and not forming part of the present invention. The takeup reel 26 then rotates in the direction indicated by the arrow V to rapidly collect the film 1, and the film then rotates the supply reel 2 in the direction indicated by the arrow VV. For rapid rearward transport of film 1 from the takeup reel 26 toward the supply reel 2, the friction clutch 102 is rendered inoperative and the power train 31 rotates the reel 2 at a high speed directly through the intermediary of the driving shaft 3. The reels 2 and 26 then respectively rotate in directions indicated by the arrows R and RR. The motor 30 is reversible so that it can rotate the takeup reel 26 in the direction indicated by the arrow V or the supply reel 2 in the direction indicated by the arrow R.

The electromagnets 13 and 17 for the arresting device 12 and pressure plate 20 of the blocking device 15 are preferably controlled by suitable trips in the form of cams or the like (not shown) on the rotating shutter 36. The film 1 is transported forwardly past the gate 35 when the shutter 36 prevents projection light from reaching the screen, and such transport is effected by the second transporting device 21 downstream of the gate 35 at a time when the electromagnet 17 does not urge the pressure plate 20 against the adjacent portion of the film 1 with such a force that the friction wheel 22 and pressure roller 24 are unable to advance the film in the direction indicated by the arrow P. By providing the shutter 36 with a requisite number of vanes and/or with a requisite number of trips for the switches which are in circuit with the electromagnets 13 and 17, the projector of FIG. 1 can be readily converted for the transport of film at two or more frequencies, e.g., at 12 and 18 frames per second, without changing the rotational speed of the shutter. The arrow 14 indicates the directions in which the arresting device 12 is movable between the illustrated operative position and a retracted or inoperative position.

FIG. 2 illustrates a portion of a modified cinematographic apparatus wherein the supply reel 202 can be driven by a first d-c motor 251 in a direction (arrow R) to collect the film 201. The takeup reel 226 can be driven by a second d-c motor 252 to rotate in the direction indicated by the arrow V, i.e., to collect the film 201. Such apparatus can operate without the friction clutches 102 and 126 because the motors 251 and 252 are used only for rapid winding of film onto the respective reels. The reversible electromotor 230 serves to rotate the friction wheels 8 and 22 in the same way as described in connection with FIG. 1. The operative connections between the motor 230 and the friction wheels 8, 22 are shown at 233 and 234. The reversible motor 230 can be replaced by a unidirectional motor (not shown) if the power trains 233, 234 are replaced by more sophisticated power trains each of which can be actuated to reverse the direction of rotation of the respective friction wheel 8 or 22 without necessitating a change in the direction of rotation of the output shaft of the unidirectional motor. Such power trains (which may employ gear trains) are well known in the art.

It is further within the purview of the invention to replace the motor 30 of FIG. 1 or the motors 251, 252 of FIG. 2 with a unidirectional motor which can drive the supply and takeup reels in directions to collect the film and which can drive the friction wheels 8 and 22 through power trains which are actuatable to reverse the direction of rotation of the friction wheels. As mentioned above, the friction clutches 102 and 126 can be omitted if the supply and takeup reels are driven by a unidirectional motor which can drive each reel only in a direction to collect the film.

The operation of the motion picture projector which is shown in FIG. 1 is as follows:

When the operator wishes to project the images of successive frames of the film 1 onto a screen or the like, the film 1 must be transported forwardly (arrow P) past the gate 35 in stepwise fashion. The pressure plate 20 of the blocking device 15 is urged against the adjacent portion of the film 1 so that the latter is pressed against the stationary portion 16 during each interval which the image of a frame is being projected, i.e., when the shutter 36 allows projection light to pass therethrough and thereupon through the projection lens, not shown. The pressure plate 20 can be urged against the film 1 in response to energization or deenergization of the electromagnet 17; in the latter instance, the blocking device 15 comprises one or more strong springs 117 which bias the plate 20 against the film in response to deenergization of the electromagnet 17.

The friction wheel 22 of the second transporting device 21 is at a standstill and the friction clutch 122 allows the positively driven shaft 23 to rotate with reference to the friction wheel 22 when the blocking device 15 holds the film 1 against forward movement toward the core of the takeup reel 26.

When the film 1 in the channel 6 is to be advanced by a step, the electromagnet 13 is energized to withdraw the tip of the arresting device 12 from the cutout 6a and the adjoining perforation of the film so that the friction wheel 8 of the first transporting device 7 can advance the film forwardly. The blocking device 15 is assumed to be operative so that the film which is advanced by the transporting device 7 is caused to form a loop which is received in the enlarged portion 6b of the channel 6. The energization of electromagnet 13 is of short duration, i.e., just sufficient to allow the transporting device 7 to advance the film 1 by the length of at least one frame. The deenergized electromagnet 13 allows a spring (not shown) to move the tip of the arresting device 12 against the rear side of the film 1 and to penetrate into the oncoming perforation prior to entering the cutout 6a of the channel 6. This terminates the forward transport of the film by the transporting device 7. From then on, the friction wheel 8 is at a standstill and the friction clutch 108 allows the driving shaft 9 to rotate with reference to the friction wheel 8 until the electromagnet 13 is energized again to withdraw the arresting device 12 to its retracted or inoperative position.

The forward transport of the film 1 downstream of the enlarged channel portion 6 takes place in response to relaxation of pressure which the plate 20 of the blocking device 15 exerts against the film portion behind the stationary portion 16. Such relaxation of pressure is preferably effected without any perceptible rearward displacement of the plate 20. If desired, the electromagnet 17 can be designed to have two different stages of energization in one of which it causes the pressure plate 20 to bear against the film 1 with full force to thus block the forward progress of film under the action of the transporting device 21 and in the other of which it allows the transporting device 21 to advance the film forwardly while the position of the pressure plate 20 remains substantially unchanged. The forward movement of the film 1 under the action of the transporting device 21 is terminated when the tension of film between the arresting device 12 (which is maintained in its operative position) and the nip of the parts 22, 24 rises. The electromagnet 17 then causes the pressure plate 20 to bear against the film while the shutter 36 allows projection light which has passed through the film at the gate 35 to pass through the projection lens and to impinge on the screen. The arresting device 12 insures that the film 1 can be advanced by increments of requisite length so that a fresh film frame registers with the gate 35 whenever the blocking device 15 is operative. The takeup reel 26 tends to rotate in the direction V to collect the film 1 so that it automatically collects such lengths of film which are advanced lengthwise by the second transporting device 21. The takeup reel 26 can be rotated by the operative connection or power train 32 and friction clutch 126 or by the d-c motor 251 of FIG. 2.

The next cycle begins with the movement of arresting device 12 to its retracted or inoperative position so that the transporting device 7 can advance a predetermined length of the film 1 into the enlarged channel portion 6b. This channel portion constitutes a temporary magazine for successive frames of the film 1.

In order to rapidly transport the film 1 from the supply reel 2 to the takeup reel 26, for example, to rapidly place one or more intermediate film frames into register with the gate 35, the operator proceeds as follows: The electromagnet 13 is caused to withdraw the arresting device 12 to the retracted position and the electromagnet 17 is caused to relax the pressure between the plate 20 and the adjacent portion of the film 1. The transporting devices 7 and 21 are then free to rapidly advance the film 1 in the direction indicated by the arrow P while the power train 31 is inoperative and the driving shaft 27 is directly coupled to the takeup reel 26 so that the latter can collect film 1 which is moved lengthwise while the transporting devices 7 and 21 operate at full speed. The friction clutch 102 may serve to brake the supply reel 2 during rotation in the direction indicated by the arrow VV to thus prevent uncontrolled spillage of film.

As explained above, the relaxation of pressure which the plate 20 of the blocking device 15 exerts against the adjacent portion of the film 1 behind the stationary portion 16 can be achieved in a number of ways. In accordance with a first embodiment, the electromagnet 17 can be of the reversible type. In accordance with a second modification, the electromagnet 17 can be energized to counteract the action of the strong spring or springs 117 which tend to bias the plate 20 against the film with a force that suffices to prevent forward movement of the film under the action of the transporting device 21. When the electromagnet 17 is energized, its action upon the pressure plate 20 neutralizes a certain portion of the bias of the spring or springs 117 so that the pressure upon the film is relaxed or terminated and the transporting device 21 can advance the film in the direction indicated by the arrow P. Inversely, the electromagnet 17 can be energized to bias the pressure plate 20 against the film 1 and the spring or springs 117 then serve to normally maintain the plate 20 in a position in which the film 1 can be transported by the device 21. Still further, the electromagnet 17 can have two conditions of energization so as to press the plate 20 lightly against the film during a first stage of energization and to press the plate 20 with a full force during a second stage of energization. The spring or springs 117 then serve to retract the plate 20 from the stationary portion 16 and the transporting device 21 is free to move the film 1 forwardly in the first stage of energization of the electromagnet 17. Finally, the blocking device can employ two electromagnets one of which is energizable to press the plate 20 against the film 1 with a full force and the other of which is energizable, in deenergized condition of the one electromagnet, to retract the plate 20 from the film path.

In order to rapidly rewind the film 1 onto the core of the supply reel 2, the operator will deactivate the arresting device 12 and the blocking device 15 and the motor 30 will be caused to rotate the supply reel 2 in the direction indicated by the arrow R so that this reel can collect all of the film which is moved by the transporting devices 7 and 21 counter to the direction indicated by the arrow P. The power train 31 is then preferably directly coupled to the reel 2 and the friction clutch 126 merely serves to hold the takeup reel 26 against excessive acceleration (arrow RR) under the action of the film 1. Such rapid rewinding of film 1 will be necessary in order to rapidly transfer one or more selected film frames to positions upstream of the gate 35 for renewed projection of their images or to rapidly rewind the entire film on the core of the supply reel 2. If desired, the friction clutch 102 may remain operative during rapid rewinding of film 1 onto the supply reel 2 and the friction clutch 126 may remain operative during rapid winding of film 1 onto the core of the takeup reel 26.

If the motor which drives the friction wheels 8 and 22 does not serve to rotate the two reels (see the motor 230 of FIG. 2), the rapid transport of film toward the takeup reel (226) is effected by deactivating the arresting and blocking devices, by causing the motor 230 to rapidly drive the friction wheels 8 and 22 forwardly, by idling the d-c motor 251 for the supply reel 202, and by starting the d-c motor 252 for the takeup reel 226 so that the latter is driven at the required high speed. If the film 201 of FIG. 2 is to be rapidly rewound onto the core of the supply reel 202, the motor 252 is idle, the motor 251 is started, and the motor 230 drives the friction wheels 8 and 22 in reverse while the arresting and blocking devices are inactive.

If the operator wishes to view the image of a selected from for an extended period of time, the electromagnets 13 and 17 of the apparatus shown in FIG. 1 are caused to activate the arresting device 12 and to bias the plate 20 against the film so that the film frame which registers with the gate 35 remains at a standstill for a desired period of time.

If the projector of FIG. 1 is to be modified so as to be capable of projecting images of successive frames while the film is being transported forwardly or rearwardly, the channel 6 of FIG. 1 is replaced with a channel 306 of the type shown in FIG. 3. This channel 306 is provided with the cutout 6a and enlarged portion 6b of FIG. 1 as well as with a second cutout 306a and a second enlarged portion 306b both located upstream of the second transporting device 21, as viewed in the direction indicated by the arrow P. The projector then comprises a second arresting device 312 which is mounted immediately upstream of the enlarged portion 306b and is controlled by a discrete electromagnet 313. If the operator wishes to project the images of frames in reverse, i.e., while the film 301 is being transported stepwise counter to the direction indicated by the arrow P, the arresting device 12 (not shown in FIG. 3) is rendered inactive and the arresting device 312 cooperates with the blocking device 15 (not shown in FIG. 3) to maintain the film 301 at a standstill during the projection of an image and to insure that the film 301 is transported rearwardly through increments of desired length, i.e., always by the length of a frame.

The entire blocking device 15 can constitute an electromagnet whose winding must be energized in order to bias the pressure plate against the adjacent portion of the film so that the latter is thereby pressed against a stationary portion of the electromagnet.

An advantage of the construction shown in FIG. 2 is that the regulation of torque furnished by d-c motors (251 and 252) can be effected by electrical means, such as by voltage stabilization. Thus, the motors 251, 252 can be designed to furnish a torque of constant magnitude in response to the application of a stabilized voltage. The application of a higher voltage will result in rapid rotation of the respective reel, i.e., the reel 202 can be rotated rapidly to collect the film 201 for the purpose of replacing the thus collected film with a fresh film or to rapidly return one or more selected film frames into register with the gate 35, and the reel 226 can be rotated rapidly in a direction to collect the film 201 for the purpose of skipping a number of film frames and of placing a selected frame into register with the gate.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a cinematographic apparatus wherein motion picture film is transported lengthwise along a predetermined path, a combination comprising a film gate adjacent to said path; first and second transporting means adjacent to longitudinally spaced-apart portions of said path and operative to urge the film in said path to move past said gate in at least one direction, each of said transporting means comprises clutch means for continuously urging the film in said one direction; a blocking device adjacent to said path between said transporting means and actuatable to assume to a first condition in which it blocks the movement of film past said gate and a second condition in which it allows the movement of film past said gate by the clutch means of one of said transporting means; and an arresting device adjacent to said path between said blocking device and the other of said transporting means and movable between operative and inoperative positions in which said arresting device respectively prevents and permits the transport of film by the clutch means of the other of said transporting means, the film being looped in a predetermined portion of said path upstream of said gate under the action of the clutch means of said other transporting means in the inoperative position of said arresting device and in the first condition of said blocking device, and the thus looped film being advanced past said gate by the clutch means of said one transporting means in the operative position of said arresting device and the second condition of said blocking device.

2. A combination as defined in claim 1, further comprising first electromagnet means for moving said arresting device between said operative and inoperative positions and second electromagnet means for changing the condition of said blocking means.

3. A combination as defined in claim 1, wherein at least one of said transporting means further comprises a continuously driven friction wheel adjacent to one side of said path and a pressing roller adjacent to the other side of said path opposite said friction wheel and arranged to bias the film against said friction wheel.

4. A combination as defined in claim 3, wherein said last mentioned transporting means further comprises a rotary driving element and the clutch means of said last mentioned transporting means comprises a friction clutch interposed between said driving element and said friction wheel.

5. A combination as defined in claim 1, wherein said blocking device comprises a stationary portion adjacent to one side of said path and a movable portion adjacent to the other side of said path opposite said stationary portion, and further comprising means for urging said movable portion against the adjacent portion of the film with a force which is greater in said first condition and smaller in said second condition of said blocking means.

6. A combination as defined in claim 5, wherein the difference between the positions of said movable portion in said first and second conditions of said blocking device is minimal.

7. A combination as defined in claim 5, wherein said means for urging said movable portion against the adjacent portion of the film in said path comprises an electromagnet and said movable portion constitutes the armature of such electromagnet.

8. A combination as defined in claim 1, further comprising a channel defining at least a portion of said path, said channel comprising an enlarged portion wherein the film is looped in the inoperative position of said arresting device and the first condition of said blocking device.

9. A combination as defined in claim 8, wherein said channel extends between said arresting and blocking devices.

10. A combination as defined in claim 1, further comprising rotary supply and takeup reels for the film and means for transmitting to said reels torque so as to rotate both said reels in the same direction during transport of the film in said one direction.

11. A combination as defined in claim 10, wherein said torque transmitting means comprises a pair of rotary driving elements, one for each of said reels, and a friction clutch means interposed between each of said driving elements and the respective reel.

12. A combination as defined in claim 10, wherein said torque transmitting means comprises a discrete prime mover for each of said reels.

13. A combination as defined in claim 12, wherein said prime movers are electric d-c motors.

14. A combination as defined in claim 1, wherein said gate is disposed between said arresting and blocking devices.

15. A combination as defined in claim 1, further comprising supply and takeup reels for the film and a single prime mover arranged to rotate said reels and to operate said first and second transporting means.

16. A combination as defined in claim 1, wherein the film is perforated and said arresting device extends through a perforation of the film in the operative position thereof.

* * * * *